United States Patent [19]

Gamblin

[11] Patent Number: 4,842,646

[45] Date of Patent: Jun. 27, 1989

[54] SUBSTANTIVE DYES, INKS AND DYE BATHS

[75] Inventor: Rodger L. Gamblin, Dayton, Ohio

[73] Assignee: Saranda Consolidated Limited Partnership, Dayton, Ohio

[21] Appl. No.: 910,653

[22] Filed: Sep. 23, 1986

[51] Int. Cl.$^4$ ............................................. C09D 11/00
[52] U.S. Cl. ........................................ 106/22; 106/20; 8/527; 8/594
[58] Field of Search ............... 106/20, 22; 8/636, 527, 8/919, 594, 595, 644, 649

[56] References Cited

U.S. PATENT DOCUMENTS

| | | | |
|---|---|---|---|
| 590,139 | 9/1897 | Dunlap. | |
| 1,787,233 | 12/1930 | Bivins | 106/27 |
| 1,905,347 | 4/1933 | Dreyfus | 106/20 |
| 2,022,413 | 11/1935 | Ellis et al. | 8/5 |
| 4,101,329 | 7/1978 | Lock | 106/22 |
| 4,156,657 | 5/1979 | Lyn | 106/22 |
| 4,159,203 | 6/1979 | Loock | 106/22 |
| 4,421,561 | 12/1983 | Brixius | 106/20 |
| 4,624,709 | 11/1986 | Atsuhu | 106/22 |

*Primary Examiner*—Josephine Barr
*Attorney, Agent, or Firm*—Donald E. Degling

[57] ABSTRACT

A dye composition comprising (a) a water insoluble nigrosine dye, induline dye or basic dye, (b) a water miscible solvent, and (c) a hydroxycarboxylic acid having at least three hydroxy groups is useful in preparing aqueous inks and dye baths. If desired, such baths may also include a mordant, a humectant and a corrosion inhibitor.

17 Claims, No Drawings

SUBSTANTIVE DYES, INKS AND DYE BATHS

The present invention relates to dyes, inks and dye baths and to methods of preparing and using such dyes, inks and dye baths. The dyes, inks and dye baths of the present invention are aqueous solutions or are soluble in aqueous solutions and are thus conveniently used. Nevertheless, they are substantive on cellulose and commonly used textiles (e.g., textiles manufactured from wool, silk, cotton, and acrylonitrile), as well as on papers, so that they may be used to obtain a permanent mark or color. The dyes, inks and dye baths of the present invention may be used with equipment that has metal or plastic parts because the compositions of the present invention tend to have a low degree of aggression toward such parts. The dyes of the present invention may be used in textile dyeing, flexographic printing of newspapers and packaging, and in the preparation of ink-jets inks and writing instrument inks.

Nigrosine and induline dyes may be prepared as the hydrochloride and as such are soluble in lower alcohols (i.e., they are spirit soluble) but are insoluble in water. These dyes may be sulfonated with sulfuric acid so as to make them water soluble. Whereas spirit soluble nigrosine and induline dyes, if used in a non-aqueous solvent (e.g., a dye bath comprising methanol, ethanol, or a glycol), are capable of permanently marking substrates such as cellulose, wood, and the like, sulfonated nigrosine and induline dyes have little affinity for many such substrates and will readily wash off upon exposure to water.

This lack of substantivity of sulfonated nigrosine and induline dyes, coupled with the inconvenience of using the more substantive spirit soluble dyes (which require an alcoholic solvent rather than water), has resulted in the textile industry and the printing industry not making substantial use of such dyes. This is unfortunate because such dyes are relatively inexpensive, have high tinctorial strength, and are relatively stable.

Water is readily available, very inexpensive and non-toxic. As a result, it is, by far the most widely used medium for the application of dyes in the textile industry and it is used as a solvent for inks whenever practical. Most papers are made so as to yield non-feathering marks with aqueous inks. Thus, flexographic and gravure printing system inks and rolling writer and fiber tip pen inks yield a sharp image with water based vehicles on such papers. Therefore, it is desirable that a dyestuff intended to be used in the textile industry or in one of the aforementioned inks be water soluble.

I have found that I can make nigrosine dyes, induline dyes, and water insoluble basic dyes soluble in water without causing them to lose their substantivity on various substrates (e.g., cellulose, silk, and wool). The dyes that may be solubilized include both the aforementioned dyes and the corresponding dye bases. Accordingly, as used herein, and unless indicated otherwise, the terms nigrosine dye, induline dye or basic dye shall be understood to include both the dye and the corresponding dye base.

In the method of my invention, solubilization of a dye in an aqueous solution is achieved by reacting the dye, dissolved in a water miscible solvent, with a hydroxycarboxylic acid containing multiple hydroxy groups. While I do not wish to be bound by any theory, I believe that such hydroxycarboxylic acids are able to solubilize a dye by forming a complex with the dye cation that is similar to a chelate. A chelate generally comprises one or more polydentate ligands and a metal ion. The interaction between the ligand and the metal ion results in a modification of the solution properties (e.g., solubility) of the metal ion. While I do not wish to be bound by theory, I believe that in a composition of my invention, the hydroxycarboxylic acid is acting as a plydentate ligand and the dye cation is acting as if it were a metal ion. The complex that results from the interaction between the hydroxycarboxylic acid and the dye cation unexpectedly is substantive upon cellulose or clay-coated substrates (e.g., claycoated paper) but has a low degree of aggression toward the metal components of printing equipment.

Many basic dyes (for example, Crystal Violet, Rhodamine B, Auramine O, Victoria Pure Blue BO, Basic Blue 1, and Basic Blue 3) are more or less water soluble and have little or no substantivity for cellulose or similar materials. Such dyes can, however, be rendered water insoluble by treating them with one or two times their own weight of an insolubilizing agent such as tannic acid or gallic acid. Other insolubilizing agents (also known as mordants) such as Tamolan A Liquid (a proprietary replacement for tannic acid, manufactured by BASF Wyandotte Corporation of Parsippany, N.J.) may also be used to render basic dyes water insoluble. It has long been known that organic acids such as acetic, citric, tartaric, formic, ethyl tartaric or glycollic acid and solvents such as acetine (the monoethylester of glycerine) are useful in maintaining at least some solubility of basic dye in the presence of tannic acid (see for example, E. Knecht & J. Forthergill, *Principles and Practices of Textile Printing,* Second Edition, pages 288–295, J. B. Lippincott Company, Philadelphia, Pa. (1924)). I have found, however, that the use of such organic acids is not desirable because the resulting solutions generally form precipitates within a day or two (See Example 15). Thus, the use of such solutions for dyeing and printing is limited to solutions that are freshly prepared. Such solutions, however, would not be suitable when used for inks or for dye baths intended to be used over a period of time, since the precipitation would prevent proper dyeing of the substrate. On the other hand, without using such acids, combinations of water soluble basic dyes with insolubilizing agents such as tannic acid and gallic acid generally cannot be applied from an aqueous bath since the combinations are insoluble in water. In order to avoid this problem, one would treat a cellulose substrate with an insolubilizing agent such as tannic acid, then subject the treated substrate, after drying, to a dye bath, and finally treat the dyed material with an aqueous solution of tartar emetic. Thereafter, the fabric would be washed and dried. Alternatively, the dye and the insolubilizing agent might be solubilized in a lower alcohol (e.g., methanol, ethanol or isopropanol) and used in an alcoholic vehicle.

I have found that by properly treating combinations of dye and tannic acid with the hydroxycarboxylic acids of the present invention, I can obtain a water soluble system that can conveniently be used to directly dye cellulosic materials, wool, silk, or acrylonitrile fabric from a single aqueous dye bath. The fabric so treated is permanently dyed and may be washed in water or put through a washing machine without substantial loss of color. Similarly, paper may be permanently dyed or printed with such compositions and the dye will not bleed off even if the paper is immersed in water.

As used herein, and unless indicated otherwise, the term "water insoluble" as applied to a nigrosine dye, an induline dye or a basic dye, means a dye that by itself or in the presence of a mordant (because it has been pretreated with a mordant (e.g., tannic acid or gallic acid) or because of the solution in which it is to be dissolved contains a mordant (e.g., tannic acid or gallic acid)) is insoluble or is soluble to an extent of no more than 1 mg/liter of water but that can be solubilized with the aid of a hydroxycarboxylic acid so that it is soluble in an aqueous solution of the present invention to an extent of at least about 150 mg of dye per milliliter of solution.

In one of its embodiments, the present invention relates to a dye composition comprising
  (a) a water insoluble nigrosine dye, induline dye or basic dye;
  (b) a water miscible solvent; and
  (c) a hydroxycarboxylic acid having at least three hydroxy groups.

The foregoing composition may be diluted with water to prepare an aqueous solution.

The present invention also relates to an ink or dye bath comprising an aqueous solution that comprises
  (a) a water insoluble nigrosine dye, induline dye or basic dye;
  (b) a water miscible solvent;
  (c) a hydroxycarboxylic acid having at least three hydroxy groups; and
  (d) water.

As will be discussed in greater detail below, the foregoing solution may be prepared by combining the dye, the water miscible solvent and the hydroxycarboxylic acid and then adding water. Alternatively, the first two components and a portion of the third component may be combined and the resulting solution may be diluted with an aqueous solution containing the balance of the hydroxycarboxylic acid. Additional ingredients, such as a humectant, a corrosion inhibitor, or both, may also be added to the inks and dye baths of the present invention.

A preferred embodiment of the present invention relates to an aqueous ink or dye bath comprising
  (a) a water insoluble nigrosine dye, induline dye or basic dye;
  (b) a water miscible solvent;
  (c) a hydroxycarboxylic acid having at least three hydroxy groups;
  (d) a mordant (e.g., tannic acid or gallic acid, preferably tannic acid); and
  (e) water.

The foregoing ink or dye bath may also contain a corrosion inhibitor, a humectant or both.

A particularly preferred embodiment of the present invention relates to an aqueous ink or dye bath comprising
  (a) about 0.0001 to about 15 parts by weight of a water insoluble nigrosine dye, induline dye or basic dye;
  (b) about 0.0001 to about 60 parts by weight of a hydroxycarboxylic acid having at least three hydroxy groups;
  (c) about 0.0001 to about 60 parts by weight of a water miscible solvent;
  (d) about 25 to about 100 parts by weight of water; and optionally,
  (e) about 0.0001 to about 30 parts by weight of a mordant (e.g., tannic acid or gallic acid, preferably tannic acid).

The foregoing ink or dye bath may also contain a corrosion inhibitor, a humectant or both.

In the dye compositions, inks and dye baths of the present invention the weight ratio of said hydroxycarboxylic acid to said water insoluble nigrosine dye, induline dye or basic dye is preferably in the range of about 4 to 1 to about 0.5 to 1, more preferably about 2 1 to about 1 to 1, and most preferably about 1 to 1. However, for dyes that are difficult to dissolve, the use of a hydroxycarboxylic acid to dye weight ratio greater that 1 to 1, and in exceptional cases greater than 4 to 1, may be desirable. In such compositions, the concentration of hydroxycarboxylic acid in the aqueous inks and dye baths of the present invention generally ranges up to about 20 percent by weight (based on the weight of the solution) and is preferably no more than about 15 percent by weight, and more preferably no more than about 10 percent by weight.

Nigrosine and induline dyes are azine dyes. Their character and preparation are described in more detail in, for example, Vol. A3 of *Ullman's Encyclopedia of Industrial Chemistry*, (VCH Publishers, Deerfield Beach, Fla., 1985). A nigrosine dye may be made by heating a mixture of aniline, nitrobenzene, hydrochloric acid, and iron slowly to a temperature of a little over 200° C. Subsequent to the heating process, the dye is powdered and slurried first with dilute hydrochloric acid and then with a dilute aqueous solution of sodium carbonate to first remove any excess aniline and then to convert the dye to the dye base form. The resulting material is sold as a dry powder to users and is called nigrosine base or C.I. (Color Index) Solvent Black 7 (C.I. Number 50415). Other nigrosine dyes are similarly prepared.

If a spirit or alcohol soluble nigrosine dye is desired, the aforementioned washing with dilute sodium carbonate solution is eliminated. If a water soluble nigrosine dye is desired, it may be prepared by heating nigrosine base to about 110° C. with three times its weight in sulfuric acid until a test sample of the reaction product becomes soluble in dilute ammonium hydroxide. The dye is then washed and neutralized with sodium hydroxide.

An induline dye may be made by heating a mixture of aniline, aniline hydrochloride, and phenylazoaniline to a temperature near 180° C. The melt is ground and washed in a weakly basic solution to form the dye base. The dye base is sold as a powder and is referred to as C.I. Solvent Blue 7 C.I. Number 50400). Other induline dyes are similarly prepared.

Dyes related to indulines but of different shades (ranging from bluish reds to deep blues) may be made by reacting together (a) an aromatic amine having its para position free, (b) the hydrochloride of the foregoing amine and (c) an aromatic amine that is substituted at its para position with a substituted or unsubstituted phenyl or napthyl azo group. Most such materials are water insoluble though some diamine compounds have a degree of solubility (but many may be insoluble when combined with a mordant). As used herein, unless indicated otherwise, the words "induline dyes" should be understood to include the foregoing dyes that are related to indulines.

There are large numbers of basic dyes that were initially prepared prior to the 1960's. Within the last twenty years, in response to the discovery that many basic dyes are lightfast on polyacrylonitrile, a number of new basic dyes have been prepared (e.g., by the diazocoupling of sulfur-containing heterocyclic compounds to aromatic amines). Generally, basic dyes are brilliantly colored and have a high tinctorial strength. Basic dyes, by definition, carry a positive charge and are also called cationic dyes since they are attracted in solution to the negative electrode or cathode of an electrochemical cell. Basic dyes that are useful in the present invention include Malachite Green, Basic Blue 1, Basic Blue 3, Basic Blue 41, Rhodamine B, Rhodamine 6G, Basic Yellow 11, Auramine O, Thioflavine T, Acridine Orange, Auramine G, Basic Red 12, 14, or 15, Basic Violet 16, Acridine Yellow, Crystal Violet, Basic Orange 21, Methyl Violet, Ethyl Violet, and Victoria Pure Blue BO. I have chosen to consider dyes such as Solvent Blue 23 (which is insoluble even in the absence of a mordant) basic dyes since they carry a positive charge in an acidic solution of a solvent in which they are soluble (e.g., methanol). Although I have referred to nigrosine or induline dyes as separate groups of dyes in discussing the dye component in my invention, nigrosine or induline dyes may also be considered basic dyes because they also carry a positive charge in an acidic solution in which they are soluble.

Basic dyes vary widely in solubility. Some such as Rhodamine B are readily soluble in water (but are insoluble when combined with a mordant) while others such as Victoria Blue B have poor solubility in water.

As used herein, and unless indicated otherwise, the term "a hydroxycarboxylic acid having at least three hydroxy groups" shall be understood to mean a hydroxycarboxylic acid having at least three hydroxy groups, not including the hydroxy group that is part of the carboxyl group and not including a hydroxy group that is a substituent on an aromatic ring. Preferably, each required hydroxy group is a substituent on an aliphatic carbon atom. It will also be understood that the hydroxycarboxylic acid should be soluble in the aqueous solutions of the present invention. Gluconic acid is the most readily available of the hydroxycarboxylic acids that are useful in the compositions of the present invention and is, therefore, preferred. Other hydroxycarboxylic acids that may be used include $\alpha$-D-glucoheptonic acid gamma-lactone, galactonic acid, and glucuronic acid. Other useful hydroxycarboxylic acids may be prepared by oxidizing sugars such as fructose, mannitol, galactose, and the like to the corresponding acids or by oxidizing similar carbohydrates to the corresponding acids. Such oxidation may be performed with bromine or nitric acid under mild conditions, for example, by warming an aqueous solution of the sugar with nitric acid. A mixture of hydroxycarboxylic acids rather than a single hydroxycarboxylic acid may be used in the compositions of the present invention and the term "hydroxycarboxylic acid having at least three hydroxy groups" shall be understood to include such mixtures. Such mixtures may be obtained, for example, by the oxidation of corn syrup.

The water miscible solvent used to prepare the dye compositions, inks and dye baths of the present invention should be capable of dissolving the nigrosine dye, induline dye or basic dye with which it is to be used and should be capable of forming a solution with water. Preferably, the solvent should not excessively attack (e.g., cause corrosion or swelling of) the metal or plastic parts used in printing and dyeing equipment. Suitable solvents include alcohols, such as methanol, ethanol, and isopropanol, glycols, such as ethylene glycol, diethylene glycol, polyethylene glycol, 1,3-butanediol, hexylene glycol, glycol DB, and glycol DE, dimethylformamide, N-methyl-2-pyrrolidine, and dimethylsulfoxide. Methanol and dimethyl formamide are preferred solvents.

A mordant is not always required for all inks or dye baths of the present invention simply because some dyes (e.g., nigrosine dyes, induline dyes, Solvent Blue 23, and Violamine) are not water soluble and thus will not readily be washed off with water. Nevertheless, most common basic dyes require a mordant when they are used to dye fibers such as silk or cotton or are used in inks for printing upon paper. Although certain dyes may not always require a mordant, the fastness of such dyes (e.g., Solvent Blue 23) may be improved if a mordant is used. Tannic acid is especially useful in fixing some dyes (e.g., Solvent Blue 23) and making them fast to washing. When a mordant is used in the dye compositions, inks and dye baths of the present invention, the amount of mordant is preferably in the range of about 2 to 1 parts by weight of mordant for each part by weight of dye or dye base.

Tannic acid is readily available and relatively inexpensive and is, therefore, a preferred mordant. Other mordants may be prepared by reacting formaldehyde with phenol or salicyclic acid or by reacting sulfur with phenols. Most such mordants are proprietary materials and, generally, their structures are not known. Tamolan A (available from BASF), discussed above, may be a reaction product of sulphur and phenol. Other fixing agents similar to tannic acid (e.g., gallic acid) may also be used. Such agents have been widely discussed in the literature. See, for example K. Venkataraman, *The Chemistry of Synthetic Dyes,* Vol. I, page 278, Academic Press, New York, New York (1952). Combinations of mordants (e.g. combinations of tannic acid and Tamolan A) may also be used as the mordant in the compositions of my invention.

I have found that when tannic acid is used to insolubilize a basic dye, the resulting material may generally be used to prepare solutions that are compositions of the present invention. However, combinations of Tamolan A and basic dyes are not always sufficiently solubilized by the hydroxycarboxylic acids of my invention. For example, combinations of Crystal Violet and Tamolan A are generally solubilized by the hydroxycarboxylic acids of my invention but combinations of Malachite Green and Tamolan A are not solubilized by said hydroxycarboxylic acids. Accordingly, as used herein and unless otherwise indicated, the term mordant, as applied to the compositions of my invention, shall be understood to mean an insolubilizing agent that combines with a basic dye to yield an insoluble material that may be resolubilized using a hydroxycarboxylic acid having at least three hydroxy groups. Whether a particular insolubilizing agent is considered a mordant of the present invention depends upon the basic dye that is used together with the insolubilizing agent. If the combination of the dye and the insolubilizing agent can be resolubilized with a hydroxycarboxylic acid having at least three hydroxy groups, the insolubilizing agent is considered a mordant of the present invention. On the other hand, if the aforementioned combination cannot be resolubilized with a hydroxycarboxylic acid having at least three hydroxy groups, the insolubilizing agent is not considered a mordant of the present invention.

The most common metallic materials found in printing presses, ink jet systems, writing instruments and textile dyeing systems are stainless steel, copper, brass, nickel and steel. Although the compositions of the present invention tend to have a low degree of aggression toward these materials, it is preferred to further protect these materials by the addition of a corrosion inhibitor. It is generally not necessary, however, to further protect the plastic components of printing, writing or dyeing equipment from the compositions of the present invention.

Compositions comprising benzotriazole and, optionally, also comprising copper sulfate are preferred corrosion inhibitors. Benzotriazole is compatible with the dye systems described below in Examples 1-14, is readily available, and inhibits corrosion without staining metal parts. Mercaptobenzothiazole is also useful as a corrosion inhibitor, either by itself or in combination with copper sulfate.

Other useful corrosion inhibitors are compositions comprising benzothiazole or mercaptobenzothiazole and a salt selected from the group consisting of stannous sulfate, other stannous salts, copper salts other than copper sulfate, and silver salts.

The optimum amount of corrosion inhibitor for a particular application will depend on variables such as the specific hydroxycarboxylic acid used, its concentration, and the pH of the solution. When a combination of benzotriazole and copper sulfate is used as the corrosion inhibitor, the concentration of benzotriazole is generally about 2.2 to about 0.5% by weight based on the weight of the solution and the concentration of the copper sulfate is about 50 parts by weight per million parts by weight of solution.

A composition of the present invention that comprises about 10% by weight of gluconic acid can generally be inhibited against corrosion of copper by as little as about 0.2% by weight (based on the weight of the solution) of benzotriazole or a few parts per million by weight (based on the weight of the solution) of mercaptobenzothiazole. A composition of the present invention that comprises about 10% by weight gluconic acid can generally be inhibited against corrosion of iron by a few parts per million by weight of copper sulfate (based on the weight of the solution) in conjunction with about 0.5% by weight (based on the weight of the solution) of benzotriazole.

For ink jet inks, a small amount of humectant (e.g., on the order of about 1 to about 2%), such as ethylene glycol, diethylene glycol, other glycols, sorbitol, glycerin, and the like is generally added in order to maintain or prevent drying out of the ink, whereas with pen inks the humectant content is generally on the order of about 15 to about 30%.

A general procedure for preparing water soluble versions of insoluble nigrosines, indulines or basic dyes is to add the dye or dye base (generally, use of the dye base is preferable in order to avoid the presence of chloride ion which would enhance the tendency of the solution to cause corrosion) to a water miscible solvent, add an agent or agents that serve(s) as a mordant (e.g., tannic acid), if required, and then add an appropriate amount of hydroxycarboxylic acid, as discussed above. The hydroxycarboxylic acid may be added as a solid or it may be added as an aqueous solution. Preferably, the hydroxycarboxylic acid is added as a solution that is 50% by weight hydroxycarboxylic acid. Such solutions where the hydroxycarboxylic acid is gluconic acid are commercially available. The weight of water miscible solvent usually is at least twice the weight of the dye and preferably is about 5 to about 10 times the weight of the dye. Reaction may occur at room temperature or gentle heating (up to about 40° C.) for a period of a few minutes may be required. Generally, the resulting solution will be completely soluble in water or it will at least be soluble in a solution that comprises up to about 10% by weight (based on the weight of the solution) of hydroxycarboxylic acid (e.g., gluconic acid). Use of such a 10% by weight solution of hydroxycarboxylic acid may be necessary in preparing an ink or dye bath comprising a very difficult to dissolve combination of dye and mordant (e.g., a combination of Tamolan A and tannic acid with a relatively water insoluble dye). When diluting the aforementioned resulting solution, it is preferable to add diluent slowly (especially when diluting with water rather than with a 10% solution of hydroxycarboxylic acid) so as not to cause precipitation of dye, particularly when the dye is one that is difficult to dissolve.

The amount of aqueous solution that should be added to the solution of dye, acid, water miscible solvent and mordant to prepare an ink or dye bath depends upon the desired concentration of dye in such ink or dye bath. Factors to be considered include the tinctorial strength of the dye, the shade of dyed fabric desired, and, for inks, the required thickness of the ink film. For an ink jet ink, the final concentration of the dye is generally in the range of about 0.1% to about 1% by weight (based on the weight of the ink), whereas for a newspaper ink, generally, the dye (e.g., nigrosine) content is between about 2 and about 15% by weight (based on the weight of the ink) and for a writing instrument ink, about 2 to about 7% by weight (based on the weight of the ink). For textile dyeing, depending upon the shade desired and the tinctorial strength of the dye, the amount of dye in a dye bath can range from about 0.0001% to as much as about 3% by weight, based on the weight of the dye bath solution.

The following non-limiting Examples 1-14 illustrate the preparation of compositions of the present invention. Example 15 is a comparative Example. Unless indicated otherwise, the materials used in the Examples were technical grade.

EXAMPLES

EXAMPLE 1

Several aqueous solutions were prepared by dissolving a dye or dye base in a water miscible solvent (e.g., methanol), adding a hydroxycarboxylic acid, warming the mixture and then diluting with water. The amount of water used to dilute the mixture was dependent upon the intended use (e.g., dye bath, ink jet ink, newspaper ink, or writing instrument ink). In all cases, however, at least 50 ml of water was used. In some cases, a mordant was added to the methanol before adding the hydroxycarboxylic acid solution. The amounts of materials used, other than water, are shown in Table I.

Using this method, the following dyes have been solubilized:
(a) roseinduline, a rose colored dye prepared by reacting phenylazo-1-naphthylamine with 1-naphthylamine, aniline, or a mixture of aniline and 1-naphthylamine. This dye has the same structure as C.I. Number 50370, but is not sulfonated.
(b) a brilliant violet dye prepared by reacting 4-(orthochlorazo)orthochloroaniline with orthochloroaniline at 180° C. This dye is not listed in the Color Index.

(c) a green dye prepared by reacting trichlorotoluene with diphenylamine in the presence of zinc chloride (C.I. Number 42125 is prepared by sulfonating this dye);

(d) 95 Neptune Blue Base NB652, obtained from BASF Wyandotte, Parsippany, N.J. (C.I. Number 42760, Solvent Blue 23), which may be made by reacting aniline with rosaniline in the presence of benzoic acid at about 200° C.;

(e) a purple dye prepared by reacting pararosaniline with aniline in the presence of benzoic acid (C.I. Number 42795 is prepared by sulfonating this dye);

(f) Spirit Fast Violet R (C.I. Number 45185) prepared by condensing ortho-toluidine with 3,6-dichlorofuran in the presence of zinc chloride; and (g) Violamine 3G Spirit Soluble (C.I. Number 45195), a violet dye prepared by condensing 2,6-xylidine with 3,6-dichlorofuran in the presence of zinc chloride.

Solvent Blue 23 exhibits good lightfastness and will not stain wool when used to dye wool polyacrylonitrile blends. Generally, I have found that the anilino type derivatives described above not only exhibit at least as brilliant a shade as the more common basic dye but also exhibit greater light fastness than the basic dye. For example, the anilino, orthotoluidino and 2,6-xylidino derivatives of Rhodamine B generally exhibit light fastness at least 2 AATCC (American Association Of Textile Colorists And Chemists) scale ratings beyond that of the parent basic dye on cotton.

EXAMPLES 3-6

Substitute 50 grams Auramine O, 50 grams Rhodamine B, 50 grams Basic Blue 1, or 50 grams Victoria Pure Blue BO for the Crystal Violet, in order to prepare respectively yellow, magenta, blue-green, and pure blue dyes. These materials can be mixed to form various shadings.

EXAMPLE 7

In order to prepare an ink for a writing instrument, two grams of Crystal Violet were added to 10 grams of dimethylformamide and 10 grams of triethylene glycol, with stirring. With continued stirring, 2 grams of tannic acid were then added, followed by 20 grams of a 50% aqueous solution of gluconic acid. The resulting solution was then diluted with 60 grams of water and 0.2 gram of benzotriazole and $5 \times 10^{-3}$ gram of copper sulfate were then added.

EXAMPLES 8-10

Substitute the following amounts of dyes and amounts of tannic acid for the Crystal Violet and tannic acid in Example 7 to obtain beautiful red, blue and green inks in Examples 8, 9 and 10, respectively:

| EXAMPLE | DYE | TANNIC ACID |
| --- | --- | --- |
| 8 | 2 grams Rhodamine B; 1 gram Auramine O | 3 grams |
| 9 | 2 grams Victoria Pure Blue BO; 0.5 gram Crystal Violet | 3 grams |
| 10 | 2 grams Basic Blue 1; 1 gram Auramine O | 4 grams |

TABLE I

| DYE OR DYE BASE | SOLVENT | HYDROCARBOXYLIC ACID | TEMPERATURE OF SOLUTION | TIME OF REACTION | MORDANT |
| --- | --- | --- | --- | --- | --- |
| 1. 10 grams of nigrosine base[a] | 50 ml methanol | 10 ml of 50% aqueous solution of gluconic acid[e] | 25° C. | 5 min. | None |
| 2. 5 grams of Malachite Green base[b] | 100 ml methanol | 10 ml of 50% aqueous solution of gluconic acid[e] | 40° C. | 10 min. | 10 grams of tannic acid[d] |
| 3. 5 grams of Baso Red, NB 546[c] | 100 ml methanol | 10 ml of 50% aqueous solution of gluconic acid[e] | 40° C. | 5 min. | 10 grams of tannic acid[d] |
| 4. 5 grams of Neptune Blue base, NB 652[c] | 100 ml methanol | 10 ml of 50% aqueous solution of gluconic acid[e] | 25° C. | 5 min. | None |
| 5. 10 grams of nigrosine base[a] | 100 ml methanol | 10 grams of α-D-glucoheptonic acid γ-lactone[d] | 25° C. | 10 min. | None |

[a]Orient Chemical Corp., Newark, New Jersey
[b]Dye Specialties, Secaucus, New Jersey
[c]BASF Wyandotte, Parsippany, New Jersey
[d]Aldrich Chemical Co., Milwaukee, Wisconsin
[e]Gem City Chemicals Inc., Dayton, Ohio

EXAMPLE 2

50 grams of Crystal Violet from Dye Specialties Incorporated, Secaucus, N.J., were added to 500 ml of methanol, with stirring. Thereafter, 50 grams of tannic acid (obtained from Mallinkrodt, Inc., St. Louis, Mo.) and 100 ml of a 50% aqueous solution of gluconic acid (solution obtained from Gem City Chemicals Inc. Dayton, Ohio) were added, with stirring. This mixture was diluted with a 10% aqueous solution of gluconic acid to give a dye bath that dyes cotton or silk in beautiful purple shades. The amount of dilution may be varied depending upon the desired depth of shade on the dyed fabric. This dye bath is suitable for dyeing cellulosic materials, silks, and polyacrylonitriles.

EXAMPLE 11

10 grams of nigrosine base (obtained from Orient Chemical Corp.) were slurried with 40 milliliters of methanol. To this mixture, a 50% solution of gluconic acid (solution from Gem City Chemicals Inc.) was added. Very shortly thereafter, the dye became totally soluble upon dilution with 450 ml of water and could be passed through a 0.7 micron filter. The resulting solution was used to dye silk, cotton, linen, jute and acrylonitrile and gave substantive dyes that after drying would not bleed off.

EXAMPLE 12

A dyestuff made according to the method of Example 11 was diluted with water so that the bath contained approximately 1% nigrosine. A textile dipped for one minute in the bath and dried at room temperature was dyed completely substantively in a beautiful gray/black color. The weakly acidic bath appeared to have no harmful effects upon the fabric.

EXAMPLE 13

In order to prepare an ink jet ink, 10 grams of nigrosine base (obtained from Orient Chemical Corp.) were dissolved in 60 grams of ethylene glycol with the aid of 12 grams of a solution of 50% by weight gluconic acid in water and 1 gram of benzotriazole. The resulting solution was diluted with 440 grams of water and filtered. This system, though completely soluble and compatible with an ink jet printer, imparted a permanent black OCR scannable mark to cellulosic and clay coated paper substrates.

EXAMPLE 14

A writing instrument ink was made by dissolving 6 grams of nigrosine base (obtained from Orient Chemical Corp.) along with $5 \times 10^{-3}$ gram of copper and 0.2 gram of benzotriazole in a solution of 10 grams of dimethylformamide and 10 grams of triethylene glycol with the aid of 7.2 grams of a 50% by weight solution of gluconic acid in water to form an ink that gives a permanent intense black mark upon writing papers when used with rolling writer or fiber tip pens.

EXAMPLE 15

In order to evaluate the suitability of organic acids for solubilizing dyes in the presence of tannic acid, I have taken one part by weight of a dye, and mixed the dye with two parts by weight of tannic acid in five parts by weight of methanol. I then added three parts by weight of an organic acid. After gentle warming for a few minutes, I then diluted the mixture with 200 parts by weight of water. This procedure was followed for each of the following dyes: Rhodamine B, Auramine O, Basic Blue 1, Crystal Violet, Victoria Pure Blue BO, Victoria Blue R, Victoria Blue B, Basic Blue 3, Malachite Green, Methyl Violet, Ethyl Violet, Basic Yellow 11, Basic Yellow 28, nigrosine and induline. The suitability of each of the following acids was evaluated as described above: acetic, citric, tartaric, formic, maleic, glycollic, and lactic acid.

With the exception of the methanol solutions of tannic acid and Victoria Blue B, nigrosine or induline, which formed precipitates immediately upon the addition of most of the foregoing organic acids, the dye-tannic acid mixtures appeared to be soluble in organic acids and did not precipitate when the solution was diluted with water. However, after a period of time ranging from a few minutes to a day or two, precipitation was observed.

I claim:

1. A dye comprising
   (a) about 0.0001 to about 15 parts by weight of a solubilized water insoluble nigrosine dye, induline dye or basic dye;
   (b) about 0.0001 to about 60 parts by weight of a water miscible solvent; and
   (c) about 0.0001 to about 60 parts by weight of a hydroxycarboxylic acid having at least three hydroxy groups and not more than six hydroxy groups.

2. A dye according to claim 1, wherein the hydroxycarboxylic acid is gluconic acid.

3. An ink or dye bath comprising an aqueous solution that comprises:
   (a) about 0.0001 to about 15 parts by weight of a solubilized water insoluble nigrosine dye, induline dye or basic dye;
   (b) about 0.0001 to about 60 parts by weight of a water miscible solvent;
   (c) about 0.0001 to about 60 parts by weight of a hydroxycarboxylic acid having at least three hydroxy groups and not more than six hydroxy groups; and
   (d) about 25 to about 100 parts by weight of water.

4. An ink or dye bath according to claim 3, wherein the hydroxycarboxylic acid is gluconic acid.

5. An ink or dye bath according to claim 3, wherein the weight ratio of said hydroxycarboxylic acid to said water insoluble nigrosine dye, induline dye or basic dye is in the range of about 4 to 1 to about 0.5 to 1.

6. A ink or dye bath according to claim 5, wherein said ratio is about 1 to 1.

7. An ink or dye bath according to claim 3, said ink or dye bath comprising
   (a) a water insoluble nigrosine dye, induline dye or basic dye;
   (b) a water miscible solvent;
   (c) a hydroxycarboxylic acid having at least three hydroxy groups;
   (d) a mordant; and
   (e) water.

8. An ink or dye bath according to claim 7, wherein the mordant is selected from the group consisting of tannic acid and gallic acid.

9. An ink or dye bath according to claim 7, wherein the hydroxycarboxylic acid is gluconic acid.

10. An ink or dye bath according to claim 7, said ink or dye bath also comprising a humectant.

11. An ink or dye bath according to claim 7, said ink or dye bath also comprising at least one corrosion inhibitor.

12. An ink or dye bath according to claim 7, wherein the weight ratio of said hydroxycarboxylic acid to said water insoluble nigrosine dye, induline dye or basic dye is in the range of about 4 to 1 to about 0.5 to 1.

13. An ink or dye bath according to claim 12, wherein said ratio is about 1 to 1.

14. An ink or dye bath according to claim 7, said ink or dye bath also comprising about 0.0001 to about 30 parts by weight of a mordant.

15. An ink or dye bath according to claim 14, wherein the mordant is selected from the group consisting tannic acid and gallic acid.

16. An ink or dye bath according to claim 15, wherein the hydroxycarboxylic acid is gluconic acid.

17. An ink or dye bath according to claim 14, wherein the hydroxycarboxylic acid is gluconic acid.

* * * * *